United States Patent [19]

Kanig

[11] 4,007,138

[45] * Feb. 8, 1977

[54] MANUFACTURE OF ION-EXCHANGING SHAPED ARTICLES

[75] Inventor: Gerhard Kanig, Ludwigshafen, Germany

[73] Assignee: Badische Anilin- & Soda-Fabrik Aktiengesellschaft, Ludwigshafen (Rhine), Germany

[ * ] Notice: The portion of the term of this patent subsequent to Nov. 12, 1991, has been disclaimed.

[22] Filed: Mar. 20, 1975

[21] Appl. No.: 560,123

Related U.S. Application Data

[63] Continuation of Ser. No. 362,233, May 21, 1973, abandoned.

[30] Foreign Application Priority Data

May 25, 1972  Germany .......................... 2225329

[52] U.S. Cl. .......................... 260/2.1 E; 260/2.2 R; 260/2.5 HA; 260/2.5 HB; 264/49; 264/203; 264/344
[51] Int. Cl.$^2$ ......................................... C08F 41/12
[58] Field of Search ........ 260/2.1 E, 2.2 R, 2.5 HB, 260/2.5 HA; 264/203, 22, 344, 49

[56] References Cited

UNITED STATES PATENTS

| | | | |
|---|---|---|---|
| 3,233,026 | 2/1966 | Richter et al. | 264/178 |
| 3,247,133 | 4/1966 | Chen | 260/2.1 E |
| 3,252,880 | 5/1966 | Magat et al. | 204/154 |
| 3,298,969 | 1/1967 | D'Alelio | 260/2.1 E |
| 3,304,272 | 2/1967 | Zenftman | 260/2.1 E |
| 3,451,951 | 6/1969 | Mizutani et al. | 260/2.1 E |
| 3,536,796 | 10/1970 | Rock | 264/344 |
| 3,847,840 | 11/1974 | Kanig | 260/2.1 E |

*Primary Examiner*—Jeffery R. Thurlow
*Attorney, Agent, or Firm*—Johnston, Keil, Thompson & Shurtleff

[57] ABSTRACT

The manufacture of ion-exchanging shaped articles, in particular fibers, fabrics and membranes, by polymerization of the polymerizable monomers of a homogeneous mixture of a polyolefin, a vinylaromatic compound, an aromatic divinyl compound and a solvent of low volatility, converting said mixture to a shaped article, removing the said solvent and introducing ion-exchanging groups into the said shaped article.

16 Claims, No Drawings

MANUFACTURE OF ION-EXCHANGING SHAPED ARTICLES

This application is a continuation of application Ser. No. 362,233, filed May 21, 1973, now abandoned.

This invention relates to a process for the manufacture of ion-exchanging shaped articles.

Cation exchangers based on polystyrene are well known. They are primarily made by introducing active groups into bead-shaped styrene polymers. For example, this may be carried out by sulfonating the polymer obtained in the bead polymerization of styrene. A drawback of the prior art ion exchangers is the usually poor utilization of the ion-exchanging capacity thereof.

It is an object of the invention to provide a process for the manufacture of ion-exchanging shaped articles, in which ion exchangers are produced which permit greater utilization of their exchanging capacity, are easier to handle and effect a more rapid exchange of ions than the prior art ion exchangers.

We have found that this object is achieved if a homogeneous mixture is prepared from a polyolefin, a vinylaromatic compound and an aromatic divinyl compound in the presence of a solvent of low volatility, polymerizing the monomers in said mixture, converting said mixture to a shaped article, removing the said solvent and introducing ion exchanging groups into said shaped articles in known manner. By shaped articles we mean fibers, woven and non-woven fabrics, granules, beads, membranes, sheeting and articles or various shapes.

Suitable polyolefins are polymers of olefins of mainly 2 to 6 carbon atoms. In general, those olefin polymers are suitable which are unchanged or only slightly changed by the introduction of active groups into the cross-linked styrene polymer. Particularly suitable are polyethylene, polypropylene, polybutene-1, polyisobutylene and copolymers of ethylene and propylene, ethylene and butene-1 and ethylene and isobutylene. It is also possible to use mixtures of said polymers. The melt index of the olefin polymers, as measured according to DIN 53,735, is between 0.1 and 50 and preferably between 0.1 and 8 g/10 minutes.

Suitable vinylaromatic compounds are styrene, acenaphthylene and substituted styrenes such as methylstyrene.

Suitable aromatic divinyl compounds are mainly 1,2-divinylbenzene, 1,3-divinylbenzene and 1,4-divinylbenzene and mixtures thereof. The aromatic divinyl compound is used in amounts of from 1 to 20% by weight, based on styrene or the styrene derivative. The said components are homogenized in the presence of a solvent. The solvents mainly used are those which show no appreciable evaporation when the mixtures are shaped, for example when they are spun to monofilament. Suitable solvents are, for example, tetrahydronaphthalene, decahydronaphthalene, anthracene, acenaphthene, diphenyl, saturated $C_{10-40}$ hydrocarbons, esters of adipic acid with alcohols of from 1 to 20 carbons, paraffin oil, campher and esters of phthalic acid with alcohols of from 1 to 20 carbons, oleic acid, stearic acid and palmitic acid. Mixtures of solvents may also be used, for example a mixture of several hydrocarbons. The amount of solvent used is from 5 to 90% and preferably from 20 to 50%, by weight of the total weight of the mixture.

To prevent premature polymerization of the monomers, the individual components may be mixed in the presence of known polymerization inhibitors such as hydroquinone monoethyl ether, hydroquinone, anthraquinone and benzoquinone. A polymerization initiator may also be added at the same time as the polymerization inhibitor. However, the polymerization initiator should be such that decomposition thereof only occurs at temperatures above the mixing temperature. Particularly suitable polymerization initiators are organic peroxide compounds, for example benzoyl peroxide, t-butyl hydroperoxide, dicumyl peroxide and t-butyl peroxide. The mixtures may be prepared at temperatures at which no appreciable polymerization of the monomers takes place. No general statement can be made concerning the upper limit of the mixing temperature, as this is dependent on a variety of factors, for example on the activity of the polymerization inhibitor and the decomposition temperature of the polymerization initiator, where these additives are present.

We prefer to form a homogeneous mixture of the olefin polymer and the low-volatility solvent at temperatures between 100° and 250° C and then to add the polymerizable monomers.

Alternatively, polymerization of the monomers may be carried out in the absence of a polymerization initiator by heating or irradiating the clear homogeneous mixture of polyolefin, monovinylaromatic compound and aromatic divinyl compound. It is not necessary to polymerize the monomers completely. The solvent and excess monomers may be removed from the mixture before or after shaping. Polymerization is generally carried out at temperatures of between 100° and 220° C. When polymerization commences the originally clear mixture becomes slighty opaque or cloudy. When an ultra-thin section of a polymerized mixture is examined under an electron microscope, it is seen that polystyrene crosslinked with an aromatic divinyl compound is present in the form of minute particles in a matrix of polyolefin. The diameter of the crosslinked polystyrene particles is generally from about 0.05 to 0.5$\mu$. The mixture of polyolefin and crosslinked polystyrene or poly(styrene derivative) may contain from 75 to 10% and preferably from 50 to 20% by weight of the crosslinked polystyrene or poly(styrene derivative).

The process of the invention is mainly used for making fibers, woven fabrics and membranes of mixtures of polypropylene and polystyrene crosslinked with divinylbenzene. If the extrudate is quenched, the shaped articles obtained have better strength properties than non-quenched articles.

The solvent is usually removed from the shaped structure by washing with a volatile solvent which is a non-solvent for the polyolefin and the crosslinked polystyrene. A suitable volatile solvent is for example methanol, acetone and light naphtha. When the low-volatility solvent has been extracted, the resulting shaped articles have micropores.

In the present invention, the ion exchanging microporous shaped articles are obtained by introducing ion exchanging groups in known manner into the above mixtures having the form of fibers, fabrics or membranes (cf. D. Braun, H. Cherdron, W. Kern in Praktikum der makromolekularen organischen Chemie, published by Dr. Alfred Huethig Verlag, Heidelberg, 1966). For example, in order to obtain a cation exchanging fiber, a fiber is sulfonated. An anion exchanging fiber is obtained for example by subjecting a fiber to chloromethylation followed by amination.

Since polyolefins are hydrophobic, it is surprising that aqueous solutions can reach the hydrophilic particles embedded in the ion exchanging mixtures. The mixtures prepared by the present invention are preferably used in the form of fibers. Although the ion exchanging mixture contains a considerable proportion of crosslinked sulfonated polystyrene, it is possible to produce fibers of satisfactory quality therefrom. However, much poorer fiber qualities are obtained if for example particulate inorganic fillers are incorporated in polypropylene.

The present invention is further illustrated with reference to the following Examples, in which the parts are by weight.

EXAMPLE 1

2 parts of polypropylene having a melt index of 0.8 g/10 min. and 1 part of tetrahydronaphthalene are mixed to a homogeneous mixture at a temperature of about 160° C and, after cooling to 140° C, are mixed with 1 part of styrene containing 8% w/w of divinylbenzene with the addition of 0.5% w/w of p-methoxyphenol as inhibitor and 0.1% w/w of di-t-butyl hydroperoxide as initiator. This amount of inhibitor is sufficient to produce a clear homogeneous mixture after about 5 minutes, the monomers therein not being polymerized up to this stage. The mixture is then polymerized in a closed vessel at 180° C for about 8 hours. Photographs taken with an electron microscope show that the system segregates so as to produce minute crosslinked polystyrene beads having a diameter of about $0.2\mu$. The finished product may be used for making filaments by melt spinning at a temperature of about 180° C, the monofilaments having a diameter of about 0.1 mm and being capable of stretching to from 4 to 5 times their length. The tetrahydronaphthalene is extracted from the filament with boiling methanol to give a porous polypropylene filament containing about 33% by weight of crosslinked polystyrene beads. The monofilament is converted to a cation exchanging filament by sulfonation. To this end, it is treated at about 100° C for 3 hours with concentrated sulfuric acid containing 0.1% w/w of silver carbonate. The sulfonated filament is then washed with progressively less concentrated sulfuric acid and finally with distilled water. The cation exchanging filament thus obtained is two thirds polypropylene and one third sulfonated polystyrene crosslinked with 1,3-divinylbenzene.

1 g of the above ion exchanger filament is used to decopper 300 cc. of an aqueous copper tetramine sulfate solution containing 80 mg of copper. The solution is decoppered after only 6 minutes.

If, however, a commercial ion exchanger in the form of beads having a diameter of about 0.5 mm is used in place of the ion exchanger filament of the invention, the time taken for decoppering is 24 minutes.

EXAMPLE 2

Example 1 is repeated to produce a fiber of a mixture of polypropylene and crosslinked polystyrene. The thickness of the fiber is again about 0.1 mm. This fiber is converted to an anion exchanger fiber in known manner by subjecting it to the action of a solution of 15% w/w of tin tetrachloride in chlorodimethyl ether at 0° C for 6 hours. The microporous fiber is then washed with methanol followed by water and quaternized by the action of a 40% aqueous trimethylamine solution over a period of 10 hours. The fiber is washed until neutral and the quaternary ammonium compound is then converted to the hydroxyl form.

EXAMPLE 3

1.5 parts of polyethylene having a density of 0.96 g/cm$^3$ and a melt index of 5 g/10 min., 1 part of styrene containing 8% w/w of divinylbenzene as crosslinker, 1 part of paraffin oil, 0.5% w/w (based on the monomer mixture) of hydroquinone monomethyl ether as inhibitor and 0.1% w/w (based on the monomer mixture) of di-t-butyl hydroperoxide as initiator are homogeneously mixed in a kneader at a temperature of 145° C over a period of 3 minutes in a manner similar to that described in Example 1. The originally clear mixture is then polymerized at 180° C for about 8 hours. The batch segregates so as to contain crosslinked particles of polystyrene having a diameter of about $0.2\mu$, in a polyethylene matrix. A microporous fiber having a thickness of about 0.1 mm is made from this mixture and sulfonated in the manner described in Example 1. There is obtained a cation exchanging fiber. Fiber is simpler to handle and provides more rapid ion exchange than an equal weight of the prior art in exchanger based on sulfonated polystyrene.

The plastics mixture may also be used for making other shaped articles such as microporous sheeting or membranes, which may be converted to cation or anion exchangers in known manner.

EXAMPLE 4

2 parts of polypropylene having a melt index of 0.8 g/10 min. and 2 parts of paraffin oil are homogeneously mixed at 180° C, and to this mixture there is then added dropwise, over about 2 hours, a mixture of 1 part of styrene containing 8 w/w of divinylbenzene and 0.5% w/w of p-methoxyphenol as inhibitor and 0.1% w/w of t-butyl hydroperoxide as initiator. Turbidity occurring after from 20 to 30 minutes indicates the commencement of polymerization. This mixture is then polymerized to completion with stirring at 180° C for 5 hours. This composition may also be converted to microporous fibers or sheeting and further processed to given ion exchangers according to known methods.

If the microporous filaments are sulfonated in the manner described in Example 1, there is obtained a cation exchanging filament showing more rapid cation exchange than the same weight of a conventional bead-shaped ion exchanger of sulfonated polystyrene. Thus 270 cc. of water having a degree of hardness of 20 are reduced to a degree of hardness of 10 by 1 g of fibrous material at a rate which is five times greater than that achieved by 1 g of commercially available ion exchanger in the form of beads (diameter 0.5 mm).

EXAMPLE 5

A microporous ion exchanger fiber having a thickness of 0.1 mm is made in the manner described in Example 4 except that no inhibitor or initiator is used. No difference can be observed in the action of this ion exchanger fiber from that of the microporous ion exchanger fiber of Example 4, when used for demineralizing water.

I claim:

1. A process for the manufacture of ion-exchanging shaped articles which comprises homogeneously mixing (a) a polyolefin selected from the group consisting of polyethylene, polypropylene, polybutene-1, polyisobutylene, a copolymer of ethylene and propylene, a copolymer of ethylene and butene-1, a copolymer of ethylene and isobutylene and mixtures thereof, with (b) a monovinylaromatic monomer and (c) an aromatic divinyl monomer selected from the group consisting of 1,2-divinylbenzene, 1,3-divinylbenzene, 1,4-divinylbenzene and mixtures thereof and (d) 5 to 90% by weight, with reference to the total weight of the mixture, of a solvent of low volatility; polymerizing the monomers in the mixture in the presence of a polymerization initiator at 100°–220° C. to produce a crosslinked copolymer thereof in said mixture in which the crosslinked copolymer constitutes 10–75% by weight with reference to the weight of said polyolefin and said crosslinked copolymer, and said crosslinked copolymer being in the form of minute particles in the matrix of said polyolefin (a), shaping the resulting product into articles in the form of fibers, woven or non-woven fabrics, beads, membranes or sheeting; removing the low-volatility solvent from said articles to provide said articles having micropores; and introducing ion-exchanging groups into the resultant microporous shaped articles.

2. A process as claimed in claim 1 wherein said monovinylaromatic monomer is styrene, methylstyrene or acenaphthylene.

3. A process as claimed in claim 1 wherein the amount of said aromatic divinyl monomer is used in an amount of 1 to 20% by weight, based on the monovinylaromatic monomer.

4. A process as claimed in claim 1 wherein said solvent of low volatility is tetrahydronaphthalene, decahydronaphthalene, anthracene, acenaphthene, diphenyl, a saturated $C_{10-40}$ hydrocarbon, an ester of adipic acid with an alcohol of from 1 to 20 carbons, paraffin oil, campher, an ester of phthalic acid with an alcohol of from 1 to 20 carbons, oleic acid, stearic acid, palmitic acid, and mixtures thereof.

5. A process as claimed in claim 1 wherein said homogeneous mixture is formed by first mixing said polyolefin and said low-volatility solvent at a temperature between 100° and 250° C and thereafter adding said monomers (b) and (c) to the mixture.

6. A process as claimed in claim 1 wherein the low volatility solvent is removed from said shaped articles by washing thereof with a volatile solvent which is a non-solvent for said polyolefin and said crosslinked copolymer.

7. A process as claimed in claim 1 wherein said ion-exchanging groups are introduced by sulfonation or chloromethylation followed by amination.

8. A process as claimed in claim 1, wherein a homogeneous mixture of said polyolefin and said solvent is first prepared at a temperature of said mixture of 100°–220° C, and thereafter said monomers (b) and (c) are added to said mixture to produce at 100°–220° C said crosslinked copolymer in the form of said minute particles in said matrix of said polyolefin.

9. A process as claimed in claim 1, wherein a homogeneous, clear mixture of said polyolefin, said monomers (b) and (c), said solvent is prepared, and then the clear mixture is heated at 100°–220° C to polymerize said monomers (b) and (c) until the mixture becomes slightly opaque or cloudy, in which latter mixture said crosslinked copolymer is formed and is present in the form of minute particles having a diameter of about 0.05 to 0.5 $\mu$ in the matrix of said polyolefin.

10. A process as claimed in claim 9, wherein said crosslinked copolymer constitutes 20–50% by weight with reference to the weight of said polyolefin and said crosslinked copolymer.

11. A process as claimed in claim 1, wherein said polyolefin (a) is polypropylene, and said monomers (b) and (c) respectively are styrene and divinylbenzene.

12. A process as claimed in claim 1, wherein said polyolefin (a) is polypropylene, said monomers (b) and (c) respectively are styrene and divinylbenzene, and said articles are fibers, woven fabrics or membranes.

13. A process as claimed in claim 1, wherein said solvent is removed by washing said shaped articles with a wash solvent selected from the group consisting of methanol, acetone and light naphtha.

14. A process as claimed in claim 1, wherein a homogeneous, clear mixture of said polyolefin, said monomers (b) and (c), said solvent, a polymerization initiator and a polymerization inhibitor is prepared, and then the clear mixture is heated to a temperature sufficient to polymerize said monomers (b) and (c) in the presence of said initiator and said inhibitor until the mixture becomes slightly opaque or cloudy, in which latter mixture said crosslinked copolymer is formed and is present in the form of minute particles having a diameter of about 0.05 to 0.5 $\mu$ in the matrix of said polyolefin.

15. A process as claimed in claim 14, wherein said polyolefin (a) is polypropylene, and said monomers (b) and (c) respectively are styrene and divinylbenzene.

16. A process as claimed in claim 15 wherein said articles are shaped into fibers containing said low-volatility solvent, washing said fibers with a volatile solvent which dissolves said low-volatility solvent and which is a non-solvent for said polyolefin and said crosslinked copolymer, and thereafter introducing said ion-exchanging groups into the resultant microporous fibers.

* * * * *